Dec. 24, 1968   F. S. NAPOLI   3,417,597
WELD STUD
Filed Feb. 6, 1967

INVENTOR
FRANCIS S. NAPOLI
BY
Mason, Mason & Albright
ATTORNEYS

United States Patent Office 3,417,597
Patented Dec. 24, 1968

3,417,597
WELD STUD
Francis S. Napoli, 7 Rajdoot Marg, Chanakyapuri,
New Delhi 21, India
Continuation-in-part of application Ser. No. 436,547,
Mar. 2, 1965. This application Feb. 6, 1967, Ser.
No. 614,159
8 Claims. (Cl. 72—377)

ABSTRACT OF THE DISCLOSURE

This invention relates to a metal welding stud and method of making same. More particularly, this invention relates to a cold formed welding stud having a shank with an enlarged recessed head at one end and a reduced tip at the opposite end of the shank. The weld stud is formed by reducing the diameter of a cylindrical workpiece at one end in several steps and enlarging the diameter of the opposite end at the same time using a sliding die and at least two punches.

Welding studs with shank portions and tip portions having smaller cross-sectional areas than shank portions are widely used in many welding systems. In use, the tip portion of a welding stud is placed against the other workpiece, current is applied with the result that the tip portion melts initially before the shank contacts the other piece. With this arrangement, an improved arc is formed and the welding of the stud to the other workpiece is achieved with less current and less heat than could be accomplished without a tip, thus permitting the welding of studs, not only to thinner wall sections, but also to unfinished sides of material with a prefinished surface plus a wider range of alloys as well.

Prior art welding studs are usually formed with enlarged heads and when such heads are formed, the tips are formed on the heads or flanged ends of the studs. Moreover, the prior art studs are not ordinarily formed with recesses in the ends opposite from the tips. Thus the prior art studs are not suitable for use in the device specifically disclosed in copending application Ser. No. 436,547 filed Mar. 2, 1965, now abandoned, of which this application is a continuation-in-part.

The welding studs disclosed herein are cold formed studs having recessed portions at one end and welding tips at the other end.

It is comparatively simple to cold form welding tips on the head or flanged end of welding studs by means of a punch attached to the hammer portion of cold heading machines. However, an entirely different problem is presented in forming tips of reduced diameters on shanks inside the die. The reason for this difficulty is that tips must be made to fill enough diameter and length in a small orifice or channel inside the tool and then be extracted unharmed together with the remainder of the stud in production cycles exceeding one or two studs per second. The conventional cold heading practice would be to upset larger diameters from smaller wire rod sizes or to extrude smaller diameters from larger wire rod sizes. The limitations in these processes are that, in general, reducing or increasing the diameter of a wire rod five fold or more is not economically feasible. Obviously, the shape of the parts being formed and the alloy being used will affect the results to some extent.

It is an object of the present invention to provide an improved welding stud having an enlarged recessed head at one end of the shank and a reduced tip at the opposite end of the shank wherein the diameter of the shank is at least five times larger than the diameter of the tip.

It is another object to provide a cold forming method for making these weld studs.

These and other objects will be apparent from the following description and drawings.

Figure 1:
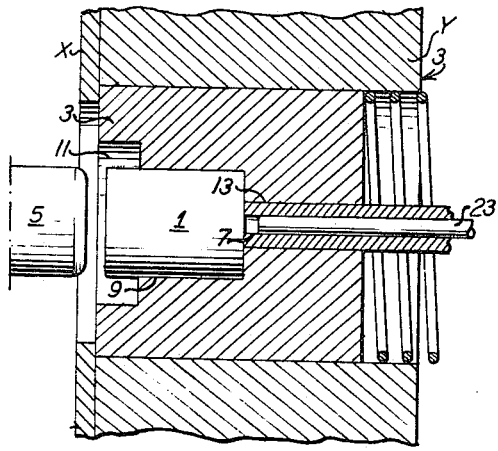
FIGS. 1 through 3 show in sequence the formation of a weld stud from a cylindrical section to the first reducing step, then to the second punching step and finally to the finished stud.
Figure 2:
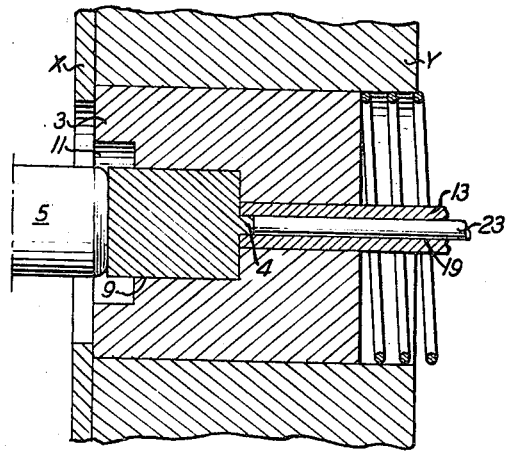
Figure 3:
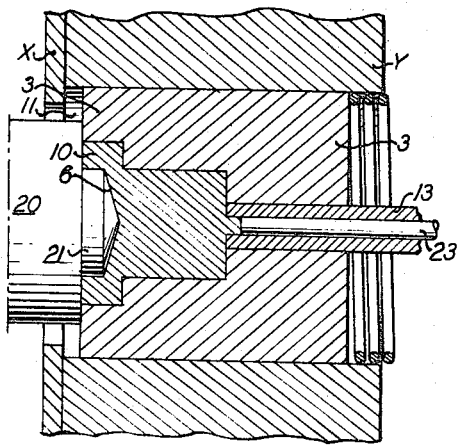

As seen in FIG. 1, cylindrical section or workpiece 1, which can be a cut-off portion of a wire rod, is inserted in a sliding die 3 by a punch 5. The continuation of the stroke by punch 5 completely inserts the cut-off workpiece 1 into cavity 9 of die 3 forcing material into a reduced neck portion 7 of sleeve 13 as shown in FIGS. 1 and 2. As shown in FIG. 3, a second punch 20 strikes the sliding die 3 forcing the material portion to be exposed of the workpiece 1 to form a cavity 6 and head 10 around tip 21.

The final step takes place on the returning stroke of the machine; the knockout forces sleeve 13 in a forward position ejecting the workpiece 1 from cavity 9 of die 3. The stop pin 23 in orifice 19 is interlinked with sleeve 13 so that sleeve 13, after ejecting the workpiece clear of the body cavity 9 in die 3, the motion of die 3 returning to its original position, as shown in FIG. 2, admits of an additional forward motion on the stop pin 23 releasing tip 4 from cavity 7 of sleeve 13. Thus the tip 4 remains intact and each weld stud is removed whole.

Figure 4:
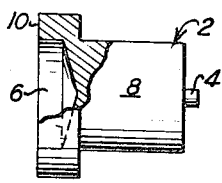
FIG. 4 shows a cross section of a finished weld stud in which a reduced tip is provided at one end of the shank and an enlarged recessed head is formed at the opposite end.

As seen in FIG. 4, weld stud 2 has a tip portion 4, a shank portion 8 and a head portion 10 with a recess 6. The diameters of the head, shank and tip portions of this specimen being about 0.18–0.22 inch, 0.1–0.14 inch and 0.01–0.02 inch, respectively, and preferably about 0.2 inch, 0.12 inch and 0.015 inch, respectively. Thus the diameter of the shank portion and the diameter of the head portion exceeds that of the tip portion by more than seven fold.

It will be appreciated that the examples and language used herein are merely illustrative purposes and that other variations will occur to one skilled in the art.

Having thus described my invention, what I claim as new and desire to secure by Letters Patent of the United States is:

1. A metal welding stud comprising an enlarged head portion, a shank portion extending from said head portion and a tip portion extending from said shank portion, said head, shank and tip portions being substantially round and of decreasing diameter, respectively, said head portion being recessed to receive a welding arbor electrode.

2. The stud of claim 1 wherein the diameter of said shank portion exceeds the diameter of said tip portion by more than five fold.

3. The stud of claim 2 wherein the diameter of said head portion exceeds the diameter of said tip portion by more than seven fold.

4. The stud of claim 1 wherein the diameter of said tip portion is about 0.01–0.02 inch, the diameter of said shank portion is about 0.1–0.14 inch and the diameter of said head portion is about 0.18–0.22 inch.

5. The stud of claim 4 wherein the diameters of said tip, shank and head portions are about 0.015 inch, 0.12 inch and 0.2 inch, respectively.

6. A method of cold forming a welding stud having a head portion, a shank portion and a tip portion, each portion decreasing in diameter, respectively, comprising the steps of reducing the diameter of one end of a cylindrical workpiece by punching same in a sliding die, further reducing the diameter of said one end of said workpiece to a tip in a reduced neck of a die sleeve while simultaneously forming a portion of enlarged diameter at the opposite end of said cylindrical workpiece and punching said enlarged portion into a recessed head portion while retaining said shank portion in said sliding die whereby the diameter of said shank portion remains about the same as the diameter of the original workpiece.

7. The method of claim 6 wherein the sliding die is urged from normal position towards said die sleeve as the recessed head portion is formed.

8. The method of claim 7, wherein a stop pin is slidingly received in the reduced neck of said die sleeve and the finished welding stud is ejected from the sliding die by moving said die sleeve back to normal position whereby said stop pin ejects the tip of the stud from the die sleeve.

References Cited

UNITED STATES PATENTS

| 2,667,650 | 2/1954 | Friedman | 72—377 |
| 2,789,344 | 4/1957 | Kaul | 72—256 |
| 3,036,367 | 5/1962 | Ricks | 72—377 |
| 3,253,115 | 5/1966 | Logan | 219—99 |
| 3,364,564 | 1/1968 | Kurtz et al. | 219—98 |

CHARLES W. LANHAM, Primary Examiner.

L. A. LARSON, Assistant Examiner.

U.S. Cl. X.R.

72—256, 354; 219—99